UNITED STATES PATENT OFFICE.

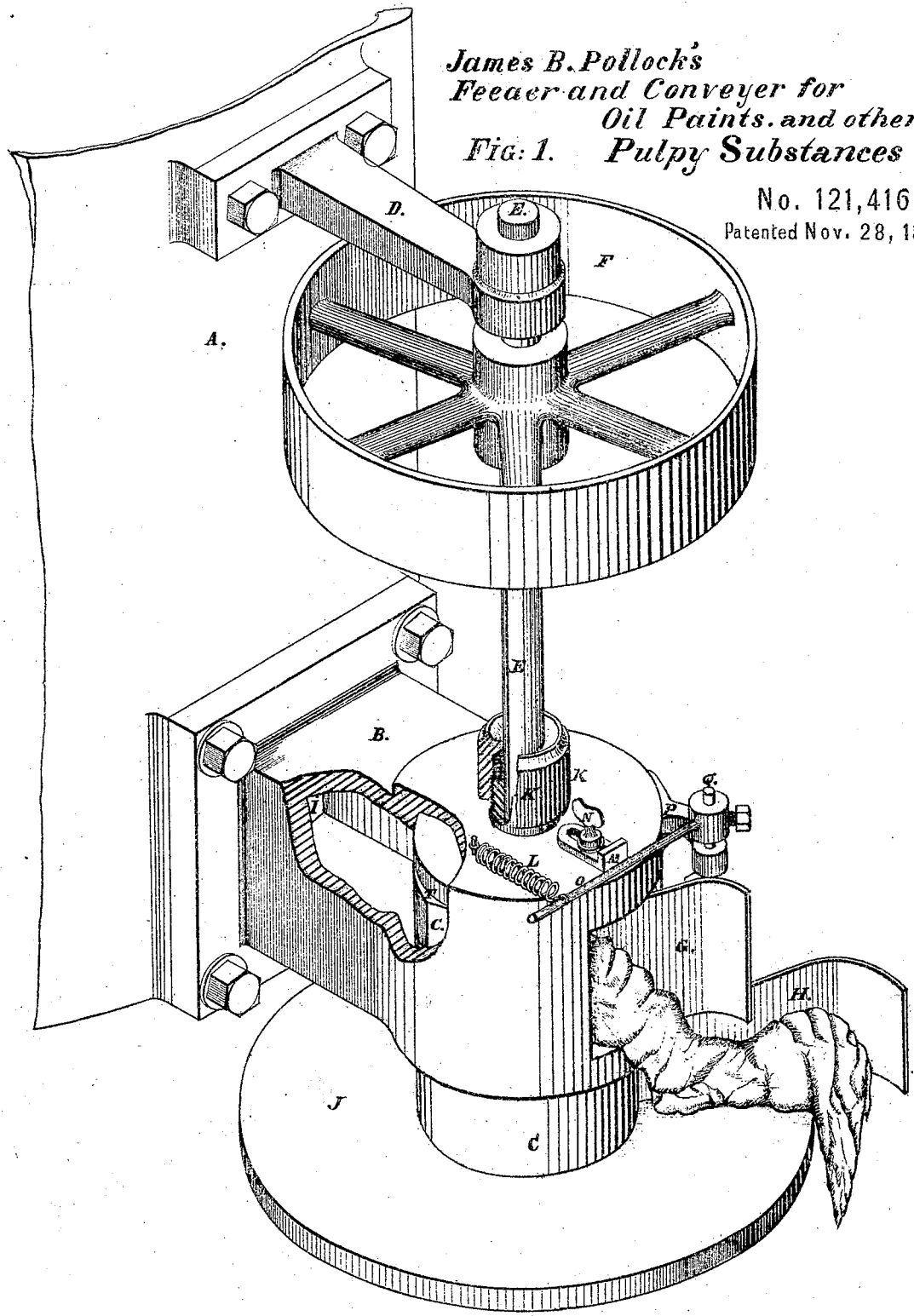

JAMES B. POLLOCK, OF PORT RICHMOND, NEW YORK.

IMPROVEMENT IN APPARATUS FOR FEEDING WHITE LEAD, &C., FROM THE MIXING-TUB TO THE MILL-STONES.

Specification forming part of Letters Patent No. 121,416, dated November 28, 1871.

*To all whom it may concern:*

Be it known that I, JAMES B. POLLOCK, of Port Richmond, in the the county of Richmond and State of New York, have invented a new and Improved Feeder and Conveyor for Oil-Paints and other oily and pulpy substances; and I do hereby declare that the following is a full, clear, and exact description thereof, which will enable others skilled in the art to make and use the same, reference being had to the accompanying drawing forming part of this specification.

My invention consists of a feeder or conveyor for oily and pasty substances, of which the essential features are a longitudinally-grooved cylinder inclosed in a cylindrical case, and a scraper, arranged in such manner that the paste is forced from the mixer or a hopper of any kind into the groove of the cylinder at one side of the case, and carried thereby to the other side, where it is taken out by the scraper, which is caused to drop into the groove, and discharged upon any receiver, preferably a revolving disk, from which it may be discharged by a fixed scraper to any other receiver or conveyor. The case serves as a cut-off to remove any excess of the paste and cause the feed to be regular and even, being the exact quantity the grooves are capable of taking; but the quantity discharged may be varied by varying the speed of the cylinder or by limiting the dip of the discharging-scraper into the groove, so that it will not take out the whole quantity contained in them.

Figure 1 is a perspective view of my improved feeder, with a part of the case and the spout leading from the mixer to it broken out. Fig. 2 is a transverse section through the cylinder and case, and Fig. 3 is a side elevation of part of the cylinder.

Similar letters of reference indicate corresponding parts.

A represents part of the side of an ordinary mixing-tub, and B a spout or feeding-tube leading therefrom to the opening I of the case B' of the feeder. C is the feeding-plug or cylinder, fitted to revolve in said case, and completely filling it except on two opposite sides, which are grooved, as shown at R. S is the discharge-opening from said cylinder opposite to the receiving-opening I, and G is a scraper, mounted at the outside of the case on the oscillating-shaft Q, with its free end bearing against the side of the cylinder so as to be forced into the grooves by a spring, L, weight, or other means, when they come around to the opening S and take out the paste, as indicated in the drawing.

In this case the paste is discharged upon the horizontally-revolving disk J, and taken therefrom by any other receiver to a fixed scraper, H; but any other receptacle may be substituted for said table, which is connected to the cylinder for convenience in turning it thereby, said cylinder being turned by pulley F and shaft E.

I have provided an adjustable stop, M N, in connection with the arm O of shaft Q to limit the dip of the scraper into the grooves for varying the feed.

T is an annular groove in the upper end of the cylinder C to allow the air to escape from the grooves through the passage S, so as not to obstruct the filling, as it would if not permitted to escape. This groove may be in the case as well. This feeder may be placed vertically, as here shown, or horizontally. In the latter case the paste would be supplied through a hopper at the top. In this case the paste is forced by the mixer through an opening, I.

Having thus described my invention, I claim as new and desire to secure by Letters Patent—

1. The combination of a feeding-tube, B, grooved cylinder or plug, C, case B', and scraper G, substantially as specified.

2. The combination, with the scraper G, of an adjustable-stop device for varying the dip of the said scraper in the groove of the cylinder, substantially as specified.

3. The plug C, provided with a groove, T, in combination with the scraper H, substantially as specified.

4. The combination, with the above-described feeder, of the revolving disk J and scraper H, substantially as specified.

JAMES B. POLLOCK.

Witnesses:
WASHINGTON HAWES,
HUGO H. LILLIEHOOK.     (107)